(12) United States Patent
Attieh

(10) Patent No.: US 7,908,220 B1
(45) Date of Patent: Mar. 15, 2011

(54) METHOD OF CONDUCTING FINANCIAL TRANSACTIONS

(75) Inventor: Mark Russell Attieh, Houghton (ZA)

(73) Assignee: Simplus (Proprietary) Limited, Gautentg (ZA)

( * ) Notice: Subject to any disclaimer, the term of this patent is extended or adjusted under 35 U.S.C. 154(b) by 0 days.

(21) Appl. No.: 09/937,976

(22) PCT Filed: Mar. 30, 1999

(86) PCT No.: PCT/IB99/00546
§ 371 (c)(1),
(2), (4) Date: Oct. 16, 2003

(87) PCT Pub. No.: WO00/58921
PCT Pub. Date: Oct. 5, 2000

(51) Int. Cl.
*G06F 17/00* (2006.01)
(52) U.S. Cl. .............. 705/64; 705/35; 705/67; 705/68
(58) Field of Classification Search .............. 705/51, 705/64
See application file for complete search history.

(56) References Cited

U.S. PATENT DOCUMENTS

| | | | | |
|---|---|---|---|---|
| 4,532,417 | A | * | 7/1985 | Nishimura et al. ............ 235/379 |
| 5,221,838 | A | | 6/1993 | Gutman et al. |
| 5,832,460 | A | * | 11/1998 | Bednar et al. .................. 705/27 |
| 5,970,479 | A | * | 10/1999 | Shepherd ........................ 705/37 |
| 5,974,146 | A | * | 10/1999 | Randle et al. ................... 705/77 |
| 6,044,360 | A | * | 3/2000 | Picciallo ........................ 705/21 |
| 6,044,405 | A | * | 3/2000 | Driscoll et al. ................ 709/232 |
| 6,134,536 | A | * | 10/2000 | Shepherd ........................ 705/34 |
| 6,304,857 | B1 | * | 10/2001 | Heindel et al. .................. 705/34 |
| 6,912,510 | B1 | * | 6/2005 | Shepherd ........................ 705/37 |
| 7,120,608 | B1 | * | 10/2006 | Gallagher et al. .............. 705/68 |
| 7,149,720 | B2 | * | 12/2006 | Shepherd ........................ 705/37 |
| 7,716,129 | B1 | * | 5/2010 | Tan et al. ........................ 705/40 |

FOREIGN PATENT DOCUMENTS

| | | |
|---|---|---|
| WO | WO9613814 | 5/1996 |
| WO | WO9745814 | 12/1997 |
| WO | WO9834203 | 8/1998 |
| WO | WO9842173 | 10/1998 |
| WO | WO0046768 A1 | 8/2000 |

\* cited by examiner

*Primary Examiner* — Calvin L Hewitt, II
*Assistant Examiner* — John M Winter
(74) *Attorney, Agent, or Firm* — Richard F. Jaworski; Cooper & Dunham LLP

(57) ABSTRACT

A method of conducting real time, on-line financial transactions includes operating at least one communication network (12) which can communicate with first and second communication devices (14, 16) having first and second electronic addresses respectively, the communication network (12) being in communication with one or more databases (20) which contain details of first and second accounts, receiving information from the first communication device (14), which information includes details of transfer to be made into the second account from the first account, communicating a signal to interrogate the first account to determine if the transfer can be made, and if the transfer can be made, debiting the first account with the amount of the transfer, and crediting the second account with the amount of the transfer.

7 Claims, 1 Drawing Sheet

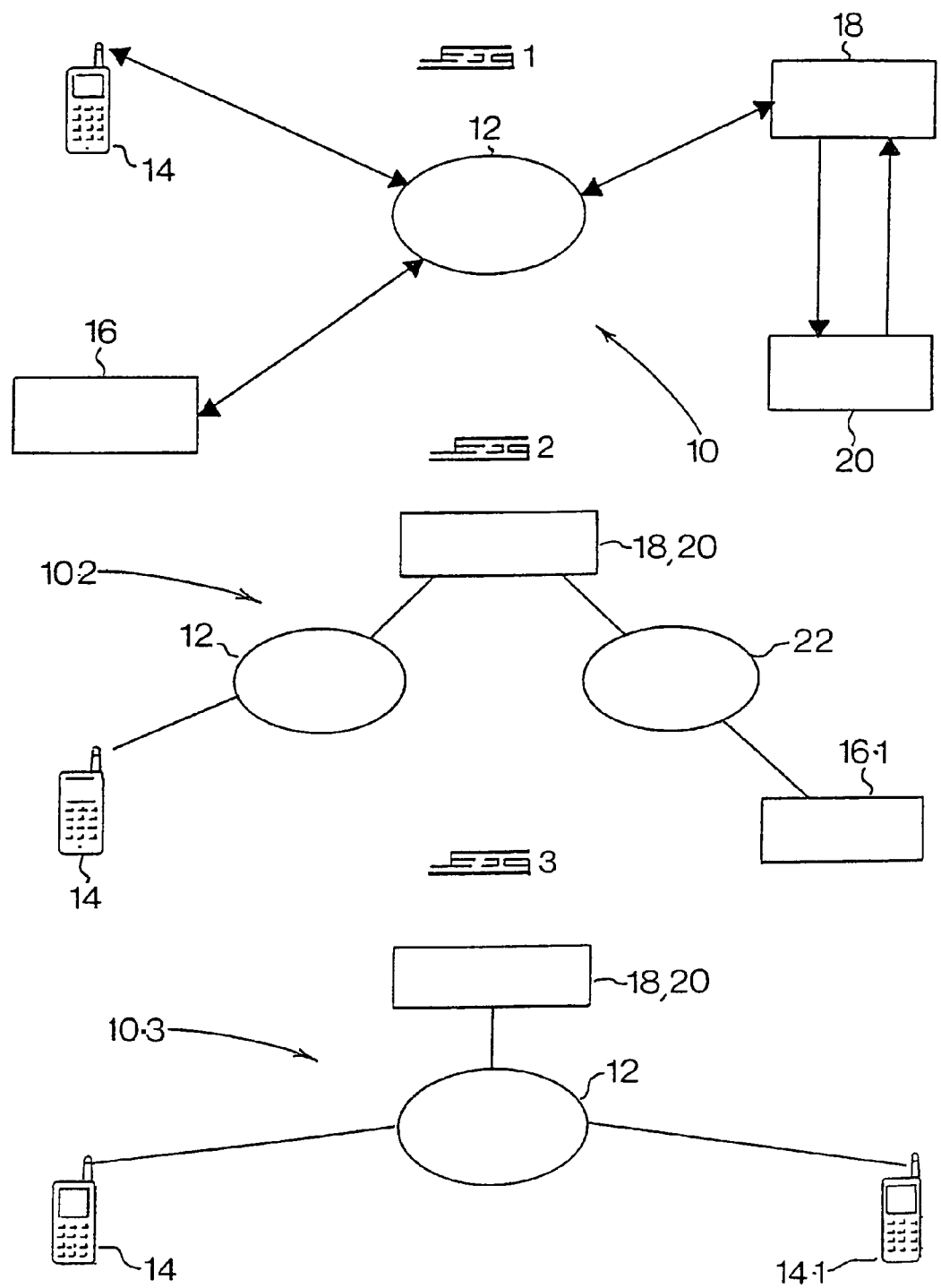

METHOD OF CONDUCTING FINANCIAL TRANSACTIONS

BACKGROUND TO THE INVENTION

Credit cards are widely used to effect payment. The credit cards are often read by a point of sale terminal which is connected via a telephone line to a banking database. Once a credit card has been read, the point of sale terminal interrogates the banking system database to determine if the card holder has sufficient funds to effect payment.

Another form of card, known as a smartcard, contains a computer chip which can be "loaded" with a certain amount of money. When such a card is used to effect payment, the balance loaded within the computer chip is reduced.

Both the credit card and the smartcard do not automatically provide card holders with details of the balance of their accounts. Furthermore credit card fraud is rife. In many cases, the only form of security associated with credit cards is the signature of the card holder, which can be relatively easily forged.

SUMMARY OF THE INVENTION

According to the invention a method of conducting real time, on-line financial transactions includes operating at least one communication network which can communicate with first and second communication devices having first and second electronic addresses respectively, the communication network being in communication with one or more databases which contain details of first and second accounts, receiving information from the first communication device, which information includes details of a transfer to be made into the second account from the first account, communicating a signal to interrogate the first account to determine if the transfer can be made, and if the transfer can be made, debiting the first account with the amount of the transfer, and crediting the second account with the amount of the transfer.

The first account is preferably associated with the first communication device and the second account is preferably associated with the second communication device.

Preferably the method includes the step of communicating the fact of the transfer to the first communication device and preferably also to the second communication device.

The one or more databases may be controlled by the person who controls communication network should the communication network also operate as a bank.

In addition to communicating the fact of the payment to the first and second communication devices, the new balances of the first and second accounts may be communicated to the respective communication devices.

The information received by the communication network from the first communication device preferably includes the first electronic address of the first communication device. The one or more databases preferably contain data which associates the first electronic address with the first account, so that upon receipt of the information, the first account can be interrogated. The information received by the communication network from the first communication device may also include a security code, such as a personal identity code. The information may also include details regarding the identity of the first communication device such as the serial number of the first communication device. Thus if the first communication device has been reported as stolen, the communication network will not process the transaction.

The details of the transfer to be made will include the second account number, the amount of the transfer and may also include a reference to indicate why the transfer was made. However it will be appreciated that if the second electronic address of the second communication device is associated with the second account in the one or more databases, then the second electronic address can be utilized instead of the second account number.

At least the first communication device may contain a subscriber identity module (SIM card) within which the first electronic address is stored. Preferably the second communication device also contains a SIM card within which the second electronic address is stored.

The first communication device may be a telephone, and thus the first electronic address will be the first telephone number. In one form of the invention, the telephone is a cellular telephone, and the communication network is a cellular telephone communication network. In another form of the invention the first communication device is an electronic wallet.

The communication network may consist of a plurality of communication networks. The plurality of communication networks may be cellular telephone networks, fixed wire networks, optical fibre networks or wireless data networks including the world wide web.

The first and second communication devices are preferably digital communication devices.

The second communication device may be a telephone, a point of sale terminal or an electronic wallet.

The information transmitted by the first communication device is preferably a file of data or transaction card which is transmitted via a Short Message Service (SMS). The file of data may have a capacity of at least 160 characters. The file of data is preferably encoded.

According to another aspect of the invention a system for conducting real time, on-line financial transactions includes a communication network which communicates with communication devices and one or more databases containing details of accounts so that when a first communication device transmits a request to make a transfer from a first account to a second account, the communication network communicates a signal to interrogate the one or more databases to determine if funds are available in the first account to effect the transfer, and if the funds are available, making the transfer within the one or more databases from the first account to the second account.

Preferably the communication network communicates the fact of the transfer to the first communication device associated with the first account and preferably also to a second communication device associated with the second account.

According to another aspect of the invention a method of conducting financial transactions including the step of linking a telephone number of a communication device to at least one bank account within a database controlled by a computer.

BRIEF DESCRIPTION OF THE DRAWINGS

FIG. 1 is a diagram of a system according to a first embodiment of the invention;

FIG. 2 is a diagram of a system according to a second embodiment of the invention; and FIG. 3 is a diagram of a system according to a third embodiment of the invention.

DETAILED DESCRIPTION OF PREFERRED EMBODIMENTS

Referring firstly to FIG. 1, a system 10 for conducting real-time, on-line financial transactions includes a cellular communication network 12 which can communicate with a cellular telephone 14, a point of sale terminal 16 and an intermediate database 18 stored within a computer. The database 18 can communicate with a bank's database 20 also stored within a computer.

The telephone number of the cellular telephone is linked with a first bank account number in the intermediate database 18. Likewise the telephone number of the point of sale terminal 16 is linked with a second bank account in the intermediate database 18. The bank's database 20 contains details of the first and second bank accounts.

A customer who owns the cellular telephone 14 and who wishes to purchase goods from a vendor who operates the point of sale terminal 16, completes a transaction card displayed on the display of the cellular telephone 14. To fill in the transaction card, the customer enters the amount to be paid, the telephone number of the point of sale terminal and a personal identity code. This information is then sent from the cellular telephone 14 to the cellular network 12 in a Short Message System format. The cellular network 12 then communicates with the intermediate database 18 which, because of the link between the cellular telephone number and the first bank account, interrogates the bank's database 20 to determine if there are sufficient funds in the first bank account to effect payment. If sufficient funds are not available, the transaction is cancelled and the fact of the cancellation is communicated to the cellular telephone 14 via the Short Message System. If sufficient funds are available, the first bank account is debited with the relevant amount, and the second bank account is credited with the relevant amount. The fact of the payment is then communicated both to the cellular telephone and to the point of sale terminal via the Short Message System. In addition, the new balances of the first account and the second account are communicated to the cellular telephone and to the point of sale terminal respectively.

It will be appreciated that the system 10 allows a cellular telephone user to use the cellular telephone as for example a credit card, smartcard, debit card, cheque account or a current account, without having to carry around such cards or a cheque book. Thus these banking transactions can be carried out using the cellular telephone.

The customer can subsequently confirm that payment was made from the first account, or determine the new balance of the first account, by entering a personal identity code and/or the telephone number/or first account number on the transaction card. This information is then transmitted to the communication network 12, which will in turn communicate the relevant answer to the cellular telephone 14.

Referring now to FIG. 2, a system 10.2 for conducting real time, on-line financial transactions between the cellular telephone 14 and a fixed transaction terminal 16.1 is diagrammatically depicted. The fixed transaction terminal 16.1 is connected to a communication network consisting of a wire network and the world wide web 22. The system 10.2 operates in similar fashion to the system 10.1

Referring now to FIG. 3, a system 10.3 for conducting real time, on-line financial transactions between two cellular telephones 14 and 14.1 is diagrammatically depicted. The system 10.3 operates in similar fashion to the system 10.1, except that the point of sale terminal 16 is replaced by the cellular telephone 14.1.

It will be appreciated that many modifications or variations of the invention are possible without departing from the spirit or scope of the invention.

The invention claimed is:

1. A method of purchasing goods by a customer at a vendor point of sale terminal using a cellular telephone number of the cellular telephone and a telephone number of the vendor point of sale terminal, linked to a first and second bank account, respectively, comprising:
    displaying by a cellular telephone a transaction card;
    receiving input data onto the transaction card by the cellular telephone wherein the input data comprises an amount for the goods, a telephone number of the vendor point of sale terminal, a cellular telephone number of the cellular telephone and a personal identity code;
    transmitting the input data of the transaction card to a cellular network;
    identifying by the cellular network the first bank account using the telephone number of the cellular phone from the input data;
    determining by the cellular network that the account has funds at least equal to the amount of goods and transferring the funds by the cellular network from the first bank account to the second bank account; and
    based on the transferring of funds, transmitting a balance for the first account to the cellular telephone and a balance for the second account to the point of sale terminal.

2. The method of purchasing goods according to claim 1, further comprising canceling the transaction when it is determined that that the account does not have funds at least equal to the amount of goods.

3. The method of purchasing goods according to claim 1, further comprising:
    providing access to an intermediate database system in communication with the cellular network and including a database, wherein linking information linking the cellular telephone number of the cellular telephone and a telephone number of the vendor point of sale terminal, to the first and second bank account, respectively, is stored in the intermediate database system.

4. A system of purchasing goods by a customer at a vendor point of sale terminal using a cellular telephone number of the cellular telephone and a telephone number of the vendor point of sale terminal, linked to a first and second bank account, respectively, comprising:
    means for displaying by a cellular telephone a transaction card;
    means for receiving input data onto the transaction card by the cellular telephone wherein the input data comprises an amount for the goods, a telephone number of the vendor point of sale terminal, a cellular telephone number of the cellular telephone and a personal identity code;
    means for transmitting the input data of the transaction card to a cellular network;
    means for identifying by the cellular network the first bank account using the telephone number of the cellular phone from the input data;
    means for determining by the cellular network that the account has funds at least equal to the amount of goods and transferring the funds by the cellular network from the first bank account to the second bank account; and
    means for, based on the transferring of funds, transmitting a balance for the first account to the cellular telephone and a balance for the second account to the point of sale terminal.

5. The system of purchasing goods according to claim 4, further comprising canceling the transaction when it is determined that that the account does not have funds at least equal to the amount of goods.

6. The system of purchasing goods according to claim 4, further comprising:

an intermediate database system in communication with the cellular network and including a database, wherein linking information linking the cellular telephone number of the cellular telephone and a telephone number of the vendor point of sale terminal, to the first and second bank account, respectively, is stored in the intermediate database system.

7. A system of purchasing goods by a customer at a vendor point of sale terminal using a cellular telephone number of the cellular telephone and a telephone number of the vendor point of sale terminal, linked to a first and second bank account, respectively, comprising:
- a cellular network, comprising digital communication devices, in communication with the cellular telephone; and
- a computer comprising an intermediate database system in communication with the cellular network and including a database;
- a display device for displaying by the cellular telephone a transaction card;
- means for receiving input data onto the transaction card by the cellular telephone wherein the input data comprises an amount for the goods, a telephone number of the vendor point of sale terminal, a cellular telephone number of the cellular telephone and a personal identity code;
- means for transmitting the input data of the transaction card to the cellular network;
- means for identifying by the cellular network and the intermediate database system the first bank account using the telephone number of the cellular phone from the input data;
- means for determining by the cellular network that the account has funds at least equal to the amount of goods and transferring the funds by the cellular network from the first bank account to the second bank account; and
- means for, based on the transferring of funds, transmitting a balance for the first account to the cellular telephone and a balance for the second account to the point of sale terminal.

* * * * *